June 1, 1971  R. A. ZEINEH  3,582,488
METHOD AND APPARATUS FOR BUFFERING, DIALYSIS
AND CONCENTRATING BIOLOGICAL FLUID SPECIMENS
Filed June 25, 1965  4 Sheets-Sheet 1

RASHID A. ZEINEH  INVENTOR

BY *Hutchinson & Milans*
ATTORNEYS

RASHID A. ZEINEH INVENTOR

BY Hutchinson & Milans
ATTORNEYS

United States Patent Office 3,582,488
Patented June 1, 1971

3,582,488
METHOD AND APPARATUS FOR BUFFERING, DIALYSIS AND CONCENTRATING BIOLOGICAL FLUID SPECIMENS
Rashid A. Zeineh, 420 Raymond Ave., Morgantown, W. Va. 26505
Filed June 25, 1965, Ser. No. 466,981
Int. Cl. B01k 1/00; B01d 13/02, 13/00
U.S. Cl. 204—180
24 Claims

ABSTRACT OF THE DISCLOSURE

A process for dialysis, buffering and/or concentrating fluid specimens whereby a fluid specimen is streamed through a first narrow pathway and simultaneously therewith a treating fluid is streamed through an adjacent second pathway. The first and second pathways are separated from each other by a semipermeable membrane to effect an interchange of permeable and diffusible particles though the membrane between the fluid specimen and the treating fluid so that a desired fluid is received at the output of the first pathway.

---

The present invention relates to biological, biochemical and medical research, and in particular, to an improved method and apparatus for buffering, dialysis and concentrating biological fluid specimens for use in such research.

Dialysis, buffering, desalting and concentration each by itself or in various combinations generally constitute an essential step or steps in many preparative or research procedures.

Such procedures include work with biological factors such as proteins, polypeptides, amino acids, cofactors, hormones, ions and others. For example, enzymes comprise one particular kind of protein which is a prominent topic in present day research. The procedures involved in the study of enzymes include purification, homogenate study, fractionation based on solubility, electrophoresis and column chromatography. The present invention is of specific application and importance in the fields of column chromatography (especially when pH and salt gradients are involved), in gel filtration and in continuous flow electrophoresis.

It is therefore the object of this invention to provide a practical, more efficient and quicker method of buffering, dialysis and concentration of biological fluid specimens than heretofore employed. These biological specimens or solutions might comprise either individual specimens being subject to individual treatment, or a plurality of specimens being treated in a continuous flow state.

In addition to the simplicity and time saving features of this method over prior methods, this invention will assist in improving the recovery of labile factors and might very well be of assistance in identification of some factors whose existence is believed to be present and substantiated by experimental evidence.

In prior art practices the procedures of dialysis, concentration, buffering and electrodialysis were used in the laboratory in treatment of biological specimens but not in a completely satisfactory method, as will now be pointed out.

DIALYSIS

In prior art practices desalting has been accomplished by the use of exchange resins (see Porter, R.R., Chromatography of Proteins, Brit. Med. Bull. 10: 237, 1954) or by the use of an electric dialyzer (see Wood, T. A. Laboratory Electrodialyzer and Desalter, Biochem. J. 62: 611, 1956), both of which while very efficient do involve methods that are tedious and time consuming, especially if there are several specimens to be desalted. The use of exchange resins might very well effect the nature of the factor worked upon during the process of exchange.

The most commonly used prior art dialysis practice is bag dialysis in a bath of distilled water. Such a process, while having the advantage of being mild, nevertheless is a very slow process and open to the additional objection that inactivation of some factors might occur (see Gryszkiewicz, A., Isolation and Properties of Human Serum Amylase, Acta. Biochem. Polonica. 9: 301, 1962). Many improvements in bag dialysis procedures have been proposed to speed up the procedure. Such proposals have involved change of water, water mixing, specimen mixing (see Reiner, M. and R. L. Fenichel, Dialysis of Protein Solution for Electrophoresis, Science. 108: 164, 1948), simultaneous mixing of water and specimens (see Ogston, A. G., Some Aspects of the Effect of Stirring on the Rate of Dialysis, The Indeculator. Arch. Biochem. 89: 181, 1960) and the like, (see Lauffer, M. A., Scientific Apparatus and Laboratory Methods, A Sensitive Check Valve, Science. 95: 363, 1942 and Stewart, A. M., Perkins, D. J. and J. R. Greening, A Rapid Rock and Roll Dialyzer, Anal. Biochem. 3: 264, 1962) but these have not been entirely satisfactory, free from other objectionable features or flexible in general use.

In my invention the individual specimens, or continually flowing and changing specimens, could be dialized, in a very short period of time. The invention employs: specimen mixing and water mixing that are insured by the mere virtue of flow in a narrow path; water washing by fast parallel or counter current flow; a high ratio of membrane surface area to specimen thickness; and in one form of the invention the employment of electrodialysis.

CONCENTRATION

In prior concentration practice the highly diluted protein in some biological fluids as spinal fluid or urine is usually concentrated by bag dialysis against dextran or polyvinylpyrrolidone. This process takes 2–7 days (see Grogan, C. H. and E. Roboz, Simple Apparatus for Concentrating Biological Fluids of Low Protein Content, J. Lab. and Clin. Med. 45: 495, 1955, and Esser, H., Heinzler, F. and H. Wild, A Simple Method for Protein Concentration of Cerebrospinal Fluid in Preparation for Paper Electrophoresis, Klin. Wchnchr. 30: 228, 1952). During this period of time bacterial growth or protein denaturation might occur.

Lyophilization (freeze drying) is another process of concentration. Lyophilization should be preceded by dialysis otherwise the nonvolatile salts are also concentrated and might have deleterious effect on the proteins (see Eaton, C. J. and M. D. Gardner, Separation of Cerebrospinal Fluid Proteins by Paper Electrophoresis, Biochem. J. 55: 25, 1953 and Schneider, G. and G. Wallenius, Electrophoretic Studies on Cerebrospinal Fluid Proteins, Scand. J. Clin. & Lab. Invest. 3: 140, 1951). Both dialysis and lyophilization are tedious and time consuming generally involving a matter of days. Activity loss takes place due to inactivation by time and due to loss of material during the transfer processes.

By my invention the concentration is obtainable in a matter of minutes to hours depending on the quantity and the required degree of concentration. In column chromatography or continuous flow electrophoresis the period of time is essentially zero, because the whole process of lyophilization and dialysis is by-passed by simultaneous application of buffering, dialysis and concentration during the chromatography or electrophoresis process.

BUFFERING

Buffering is usually achieved by adding the buffer or the solid material in certain amounts to get a certain pH. Usually this involves acidification, neutralization or alkalization of the original specimen. This has been a rather complicated and slow process in order to achieve satisfactory results. By my invention the specimen is streamed against the desired buffer and simultaneously buffering and dialysis take place.

Buffering is important at times since it is used to achieve optimal activity or to prevent inactivation of certain factors due to pH variation (see Eaton, C. J. and M. D. Gardner, Separation of Cerebrospinal Fluid Proteins by Paper Electrophoresis, Biochem. J. 55: 25, 1953; Gilbert, G. A. and A. J. Swallow, Studies on Dialysis. Changes of pH during Dialysis. Biochem. J. 47: 506, 1950, and Gilbert, G. A. and A. J. Swallow, Studies on Dialysis. 1. An Appplication of Ion-Exchange Resins, Biochem. J. 47: 502, 1950). For example, in column chromatography the collected fractions under variable pH stay for a certain period of time in solution until the chromatography process is over. Then all the fractions are taken and assayed. During this time denaturation due to pH might occur. By the employment of my invention the fractions are buffered simultaneously during the chromatographic run.

ELECTRODIALYSIS

In prior research practices (see Wood, T. A. Laboratory Electrodialyzer and Desalter, Biochem. J. 62: 611, 156) only one specimen could be treated each time. For each individual biological specimen, the apparatus had to be disassembled and reassembled. The use of a single stage process makes it time consuming.

In one form of my invention I employ two stages of electrodialysis in series. The removal of the majority of salt is achieved in the first stage which is of low voltage and high electric current. The complete removal of the remaining traces of salt is achieved in the second stage which is of higher voltage but low electric current.

My apparatus does not need to be disassembled after each run. Rinsing with distilled water between individual runs is all that is necessary when a plurality of biological specimens are to be dialyzed. This invention is superior to the prior electrodialyzer practice by being able to treat continually flowing biological specimens, for example, as in dialyzing the eluates of column chromatography, while the conventional electrodialyzer can only treat a single biological specimen at a time.

Broadly speaking in my invention I preferably employ three paths separated by semipermeable membranes through which anions and cations of dissolved salts may pass. The specimen of biological solutions to be treated is passed through the middle path, while the treating solution (distilled water, buffer, buffered polyvinylpyrolidone or dry air driven by suction) is passed through the two side paths in opposite direction to the flow of the specimen. An interchange of permeable and diffusable ions occurs between the specimen in the middle path and the treating medium flowing in the two side paths passing through and across the semipermeable membranes.

In another form of this invention a complete removal of ionizable salts and other permeable ions or ionizable particles is achieved by electrodialysis. This is accomplished by placing two platinum wire electrodes, one in each of the side-paths and applying a direct voltage source to these electrodes. The biological specimen could be treated to the desirable degree by varying the flow rates of the specimen or by adding more sets in series, or by varying the electrical current.

Other and further objects and advantages of the present invention will become apparent from the following description and appended claims, reference being had to the accompanying drawing showing preferred embodimets and forming a part of this specification. The invention may be embodied in the forms illustrated in the drawings, attention being called to the fact, however, that the drawings are illustrative only, and that changes may be made in the specific constructions illustrated and described, so long as the scope of the appended claims is not violated.

In the accompanying drawings.

Figure 1:
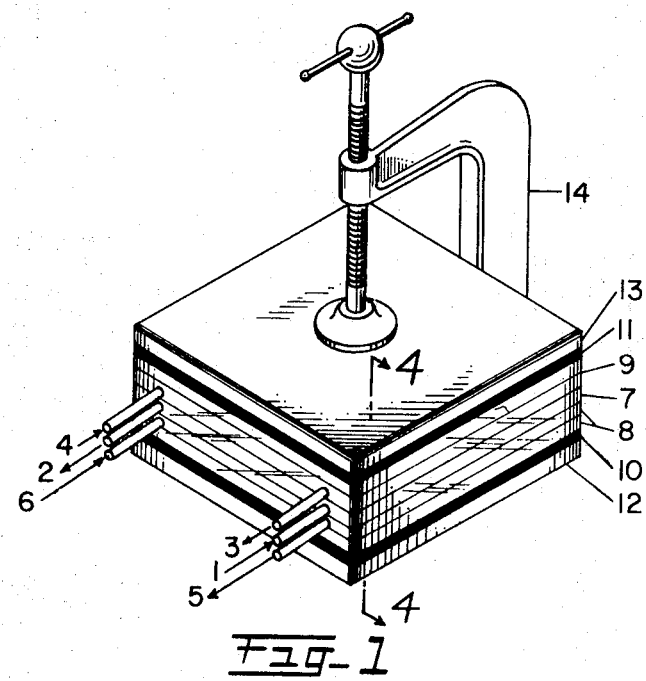
FIG. 1 is a perspective view of a single set of the invention in operative clamped assembly with arrows showing the direction of flow of the specimen in countercurrent direction to the treating solution in the two side-paths.

Referring now to the drawings in detail, the buffering dialysis and concentration are accomplished by the use of the apparatus shown as an assembled set in FIG. 1, references also being made to FIGS. 2 to 5, for a clearer understanding of the preferred structure.

Basically the unit or cell preferably comprises three plates, a mildle plate 7, an upper plate 9 and a lower plate 8, each of which has formed therein what may be termed a fluid path identified in the drawings as $a$, $b$ and $c$. Middle plate 7 and its bath $b$ are separated from the upper and lower plates and their respective paths $a$ and $c$ by semipermeable membranes 28 and 29 in the assembled set.

The plates may be made of any desired size depending on the requirements of a research project, but for experimental purposes were formed 15 x 15 x 0.2 cm. in dimensions. These plates are preferably selected of plexiglass, Teflon, vinyl or of any similar plastic sheet material.

Figure 2:
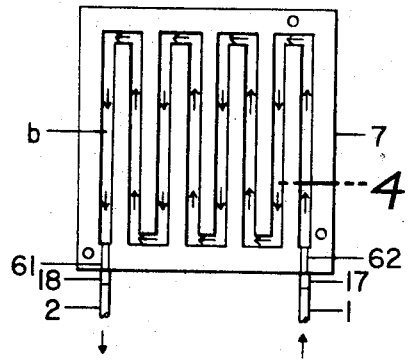
FIG. 2 is a top plan view of the middle plate showing the slotted path therein with arrows indicating the direction of the specimen flow.
Figure 5:
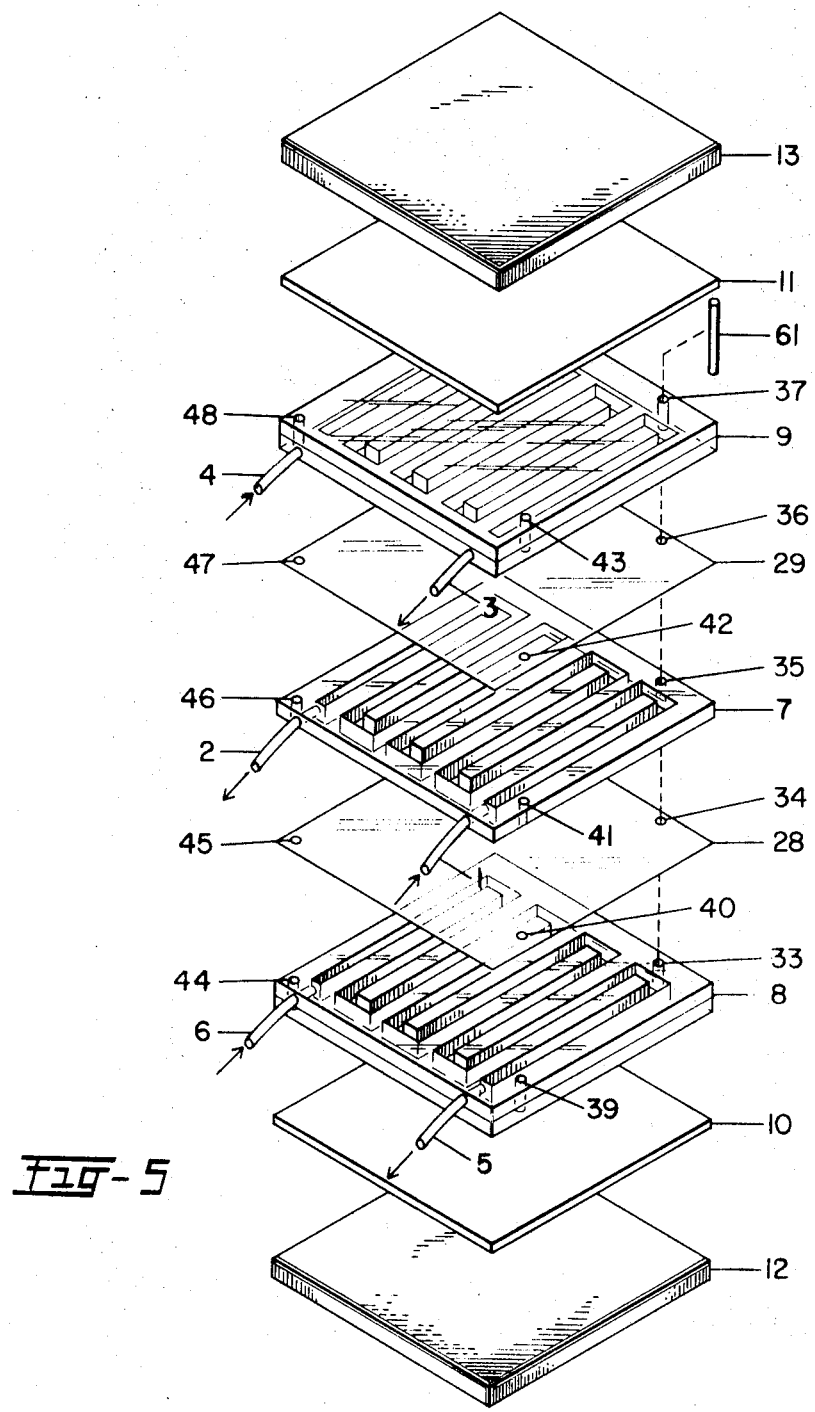
FIG. 5 is an exploded perspective view of the assembled set showing the relative position of each part.
Figure 6:
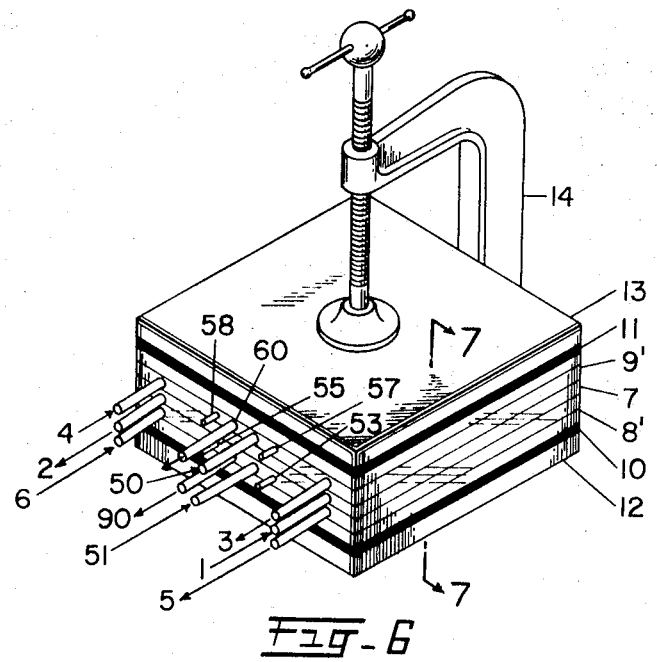
FIG. 6 is a perspective view of a single set embodying a modification of the invention for electrodialysis in an operative clamped assembly.

In plate 7, is formed, in any suitable manner, by cutting, molding, or otherwise, a serpentine slot or slit as shown to form the bath $b$ (FIGS. 2 and 5). The end side wall of the plate is suitably bored at 61 and 62 to receive nipples 17 and 18 connecting the ends of the serpentine path to suitable inlet and outlet lines 1 and 2, respectively, through which the biological specimen which is to be treated enters and leaves path $b$.

Lower and upper plates 8 and 9 have suitably formed in their respective facing surfaces grooves or slots of corresponding sepentine formation which register precisely with the serpentine slot forming path $b$ in the middle plate.

Figure 3:
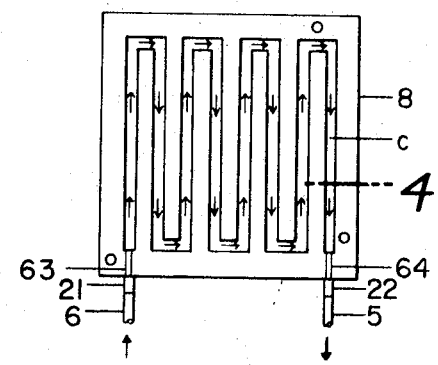
FIG. 3 is a top plan view of the lower plate showing one of the side-paths which is formed by a groove in the upper side of the plate. This figure is also a mirror image of the upper plate.

One of these plates, namely, the lower plate 8, is shown in FIG. 3. The end side wall of this plate is bored at 63 and 64 to receive nipples 21 and 22 connecting the ends of the path $c$ to suitable inlet and outlet lines 6, 5, respectively, through which the treating solution enters and leaves said path $c$. A similar view of upper plate 9 is not shown in the drawings since the construction is the same as that for plate 8 but in reversed relationship. The upper plate is similarly bored, provided with nipples and connected to inlet and outlet lines 4 and 3, respectively, for the flow of the treating solution.

As shown in the drawings and as employed in experimental models of this unit or cell the upper and lower plates 9 and 8 are each actually formed of two plates each of which is substantially the thickness of the middle plate 7. This was done for convenience in forming registering paths in the three plates at one and the same time. After the plates were cut to form the serpentine slots *a* and *b* the second and uncut portion of each was adhesively secured to the outside surfaces to form the two slotted composite plates 8 and 9 as will be understood by referring to FIGS. 4 and 5. However, these plates need not be formed in this manner and can be formed of a single plate of double thickness suitably grooved in any manner to provide the necessary paths *a* and *c* capable of precise registry with the path *b* of the middle plate.

The membranes 28 and 29 separating the middle plate from the upper and lower plates may be of any of a plurality of sheet materials, such as cellulose acetate, cellophane, polyethylene or other synthetic or natural sheet materials. The membranes used for experimental study were of 60–80 angstrom pore size cellophane sheets.

The three plates 7, 8 and 9 are assembled with the intervening membranes 28 and 29, as shown, with their respective paths *a*, *b* and *c* in precise registry. Rubber blankets or sheets 10 and 11 and heavy steel plates 12 and 13 are placed on the bottom and top of the asembly and the whole set is then carefully and firmly pressed or clamped together by the use of a C-clamp 14 or other suitable means to hold the set in firm assembled relationship.

To facilitate registry of the plates in assembly the plates are preferably provided with aligning holes such as 33, 35, 37; 39, 41, 43; and 44, 46 and 48 for the reception of suitable aligning pins 61, only one of which is shown in the exploded view seen in FIG. 5. In assembly the membranes are preferably wetted with warm water and stretched over the respective plates. Holes may be punched in the stretched membranes as at 34, 40 and 45 in membrane 28 and 36, 42 and 47 in membrane 29, and while the plates and membranes are held in registry the three pins 61 may be passed through the aligned holes to hold the unit in proper registry for the remaining assembly of rubber sheets, metal sheets and clamping means.

The biological specimen solution enters the set through inlet 1 and flows through the serpentine path *b* in the middle plate and is collected from outlet 2 after being treated. The treating solution or fluid is streamed in plates 8 and 9 entering through inlets 4 and 6 and flowing through paths *a* and *c* in opposite direction to the flow of the specimen fluid. The treating fluid may be either collected or discarded as desired as it flows from outlets 3 and 5.

It will be seen that the biological specimen flowing in path *b* is separated from the treating fluid flowing in paths *a* and *c* by the semipermeable membranes, through which an interchange of permeable particles does occur between the specimen fluid and the treating fluids. The rate of flow of the specimen and/or treating fluid is controlled in any desired manner, such as, by use of any suitable pump or by siphoning, to suit the specific requirements of a particular project.

If the specific requirements are not secured by a single set then the specimen leaving outlet 2 may be fed into another set or cell which is preferably fed separately with other treating solution. Thus any number of sets could be employed and added to the apparatus to meet the requirements of a particular experiment or problem.

Now referring to FIGS. 6 to 9, inclusive, I have disclosed modified form of the invention directed to electrodialysis in which each set or cell, preferably consists of two units in series relationship as will be pointed out hereinafter. In this modification the set or cell is constructed for the most part similarly to the set shown in FIGS. 1 to 5 and the same reference numerals have been used to denote similar parts. The differences occur in the construction and form of the lower and upper plates which have been identified as 8' and 9' respectively.

Figure 8:
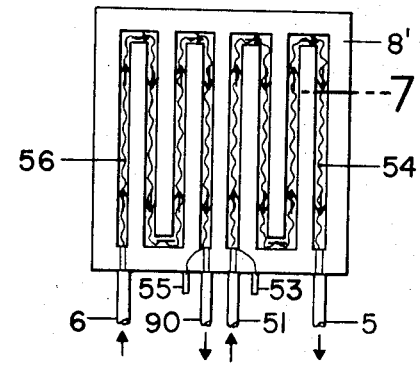
FIG. 8 is a plan view of the lower plate of the electrodialysis set shown in FIG. 6 and composed of two units or stages.

FIG. 8 shows bottom plate 8' in plan and it will be understood that top plate 9', not shown in plan, is of similar construction but in reverse arrangement of parts. Instead of having a single tortuous or serpentine slot formed therein, each plate now has two separate serpentine paths each provided with an inlet 51 and 6' and an outlet 5' and 90 as seen in FIG. 8 with reference to plate 8'. Upper plate 9' has similar inlets 50 and 4' and outlets 3' and 60, shown in FIG. 6, to its two slots or paths. The slots in both plates are cut to register with the slot or path *b* of the middle plate when the set is assembled.

Figure 7:
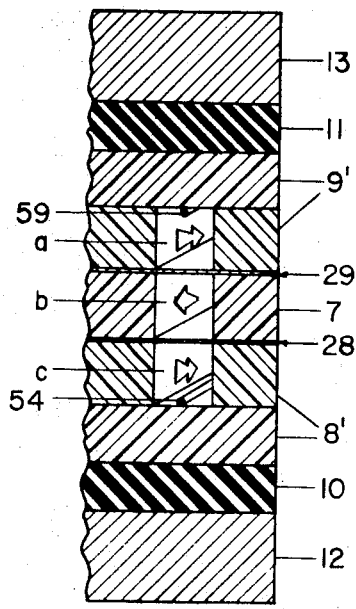
FIG. 7 is a fragmentary cross-sectional view, on a larger scale, taken on the line 7—7 of FIG. 6.

In each of the separate paths formed in the bottom and upper plates an electrode is positioned. Referring to FIG. 8 electrodes 54 and 56 are placed in the two paths of the bottom plate and are suitably connected to terminals 53 and 55 respectively as shown. Similar electrodes, one of which is shown at 59 in FIG. 7, are placed in the paths of the upper plate 9' and are connected to terminals 57 and 58. These electrodes may consist of any suitable metallic wire or ribbon and preferably of platinum. Furthermore the electrodes are preferably tagged to otherwise anchored or fixed to the outer wall of the slot, i.e., that wall furthest removed from the membrane when assembled, as clearly shown in FIG. 7.

Figure 9:
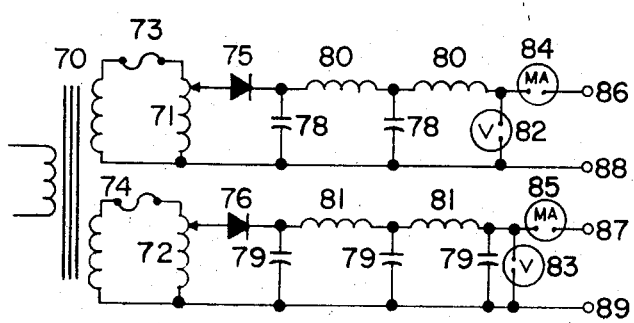
FIG. 9 is a diagrammatic wiring diagram of the power supply that might be employed in connection with the modification shown in FIG. 6.
Figure 4:
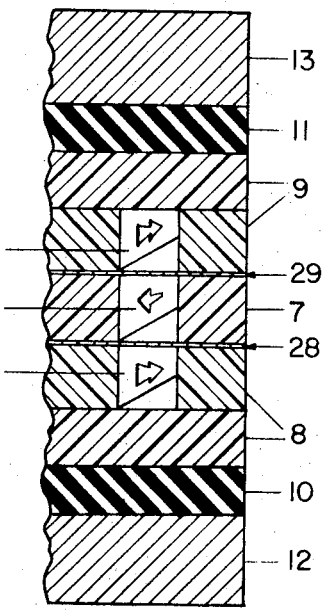
FIG. 4 is a fragmentary, cross-sectional view, on a larger scale, taken on the line 4—4 of FIG. 1 showing the three associated paths.

A low voltage (up to 10 volts) but fairly high current (up to 3,000 milliamperes) source is connected across the terminals 57 and 53 of the first unit and a high voltage (10–100 volts) but fairly low current (preferably below 300 milliamperes) source is connected across the terminals 58 and 55 of the second unit. Any desired electrical apparatus and circuit may be used to supply the proper voltage and current to the terminals. In FIG. 9 is disclosed one such circuit.

In the diagrammatic circuit shown in FIG. 9 the secondary coils of transformer 70 are connected to variable transformers 71 and 72. Transformer 71 is selected to have a maximum output of up to 100 volts and transformer 72 to have a maximum output of up to 10 volts. The respective circuits leading from transformers 71 and 72 preferably include protective fuses 73 and 74, rectifiers 75 and 76, chokes 80 and 81 condensers 78 and 79 along with suitable voltmeters 82 and 83 and ammeters 84 and 85 all connected in operative circuits to deliver the desired voltage and amperage across the respective terminals 86–88 and 87–89.

It will be understood that terminals 87 and 89, comprising the low voltage and high current source, are connected to the terminals 57 and 53 of the first unit or stage of the set and terminals 86 and 88, comprising the high voltage and low current source, are connected to terminals 58 and 55 of the second stage or unit of the set.

In lieu of the use of metallic electrodes 57–58 and 54–56, as shown and described above, it is within the scope of my invention to form the electrodes of carbon or similar material. For example, the outer portion of each of the composite upper and lower plates 9' and 8' could be formed of carbon to which the power source could readily be connected. In this instance the outer wall of each path *a* and *c* would constitute an electrode to which the respective anions and cations would be attracted.

The biological specimen solution is passed through path *b* in the middle plate 7 entering at 1 and leaving the set by outlet 2. However, in this form of the invention I actually have a set formed of two units. In the first unit the treating solution or distilled water enters the set through inlets 50 and 51 and leaves the set through outlets 3' and 5' in the upper and lower plates, respectively. In the second unit the treating solution enters the set through inlets 4' and 6' and after flowing through the paths leaves the set from outlets 60 and 90, in the upper and lower plates respectively. In each unit the treating solution flows in opposite direction or counter current to the specimen flow.

The voltage applied to the electrodes in each unit will attract the anions and the cations that pass through the membranes 29 and 28 to the paths *a* and *c*, thus desalting the specimen. The treating solution washes away the anions or the cations atttracted to the respective electrodes from the specimen.

The employment of the two stage system of electrodialysis described above has been found to produce superior results in salt removal over a single stage system. In single stage electrodialysis it has been found that complete removal of salt is rather difficult to achieve because when high voltage is employed the permeability of the membrane is effected. It is believed that this interference is due to the combined effect of a high electrical current and high voltage which would be employed in a single stage system. In the two stage system, a low voltage-high current application in the first stage will remove the majority of the salt from the specimen, with the balance or trace amount of the salt being removed in the second stage with a high voltage-low current application.

Furthermore, the two stage system, as will be pointed out later, avoids heating of the specimen and has been found to be more economical in use.

It also will be appreciated that in the preferred forms of the invention illustrated in the drawings and described above, there has been employed two membranes separating three flow paths. However, it is within the scope of my invention to employ a single membrane system separating two flow paths. To illustrate this so-called single membrane system, plate 7 and one of the two membranes could be eliminated from the unit shown in FIGS. 1–5, so that the flow paths of plates 9 and 8 are then separated by a single membrane. In this instance the biological fluid specimen would be streamed in one path and the treating fluid would be streamed in the other path. Such a modification has been found efficient in use but naturally is not as efficient as the two membrane system illustrated in the drawings as pointed out hereinafter.

The following experimental examples are given to illustrate some features of operation and the results obtainable.

DIALYSIS (DESALTING)

In a system of two plates only 8 and 9 (without plate 7), where the groove is of 220 cm. long and 1.5 mm. width and 1.5 mm. depth the interchange of permeable particles was only through one cellophane membrane the following characteristics were noticed.

(a) Specimen flow: From Table 1 it is seen that the efficiency of dialysis increases with decreasing rate of flow of the specimen.

Table 1

The effect of specimen flow on the efficiency of dialysis (percentage of salt removed from the specimen). Water flow was constant 150 cc./hr. The specimen salt concentration was 350 mM. (millimolar) NaCl.

| Specimen flow in cc./hr. | Salt concentration in treated specimen in mM. | Efficiency of dialysis in percent |
| --- | --- | --- |
| 4 | 3.5 | 99 |
| 20 | 105.0 | 70 |
| 40 | 180.0 | 50 |
| 200 | 265.0 | 25 |

(b) Water flow: From Table 2 it is seen that increasing the water flow increases the efficiency of dialysis, i.e., the percentage of salt removed from the specimen.

Table 2

The effect of water flow on the efficiency of dialysis. The specimen flow was 20–25 cc./hr. The specimen salt concentration was 350 mM. NaCl.

| Water flow in cc./hr. | Salt concentration in treated specimen in mM. | Efficiency of dialysis in percent |
| --- | --- | --- |
| 20–25 | 126 | 64 |
| 70–90 | 80 | 77 |
| 400–500 | 52 | 85 |

(c) Temperature: The efficiency of dialysis at room temperature is higher than that in a refrigerator or cold room. See Table 3.

Table 3

The effect of temperature on the efficiency of dialysis. A constant water flow of 450 cc./hr. and a specimen of 350 mM. NaCl concentration were used.

| | Temperature in degrees centigrade | Salt concentration in treated specimen in mM. | Efficiency of dialysis in percent |
| --- | --- | --- | --- |
| Specimen flow in cc./hr.: | | | |
| 10 | 5 | 80 | 77 |
| 10 | 24 | 42 | 88 |
| 20 | 5 | 180 | 50 |
| 20 | 24 | 104 | 70 |

(d) Number of sets in series: From the repeated countercurrent dialysis Table 4 the efficiency of dialysis increases to very high values approaching 100 percent.

Table 4

The effect of number of dialysis sets in series. A diluted serum specimen was used. Its salt concentration was 316 mM. NaCl. The specimen flow was constant 20–25 cc./hr. and the water flow was constant 450 cc./hr.

| | Salt concentration in treated specimen in mM.NaCl | Efficiency of dialysis in percent |
| --- | --- | --- |
| Number of sets: | | |
| 1 | 43.0 | 86.4 |
| 2 | 10.5 | 96.7 |
| 3 | 4.9 | 98.4 |
| 4 | 2.3 | 99.3 |

(e) Parallel versus counter-current. Theoretically in parallel flow dialysis, the maximum efficiency of dialysis approaches 50 percent but in counter-current dialysis the maximum efficiency is expected to approach 100 percent. This is when both the specimen and the water of dialysis have the same speed of flow. This difference decreases when the rate of water flow increases. See Table 5.

Table 5

The effect of water direction of flow. A constant specimen flow of 20–25 ml./hr. was used.

| | Parallel flow efficiency of dialysis in percent | Counter-current flow efficiency of dialysis in percent |
| --- | --- | --- |
| Water flow in cc./hr.: | | |
| 20–25 | 38 | 52 |
| 100 | 59 | 64 |
| 250 | 61 | 66 |

The term efficiency of dialysis could be misleading in this context because what is of value here is not how much salt was removed but how much salt remained in the specimen. This is due to the fact that the remaining salts are concentrated with the specimen when lyophilization is applied, and they might be of deleterious effect when they are concentrated.

Two membrane system: In a system of 40 cm. path length 2 mm. width and 2 mm. deep, Table 6, the efficiency of the two membrane system, as disclosed in the drawings, is higher than the efficiency of one membrane system. Two sets in series are of higher efficiency than one set. Efficiency is increased by decreasing the specimen flow in double membrane system.

Table 6

Dialysis in double membrane system. A human serum specimen was used. Its dilution was 400 folds. Its salt concentration was 960 mM. NaCl. A constant water flow 450 cc./hr. was used.

| Conditions | Specimen flow in cc./hr. | Treated Specimen concentration in mM. NaCl | Efficiency of dialysis in percent |
|---|---|---|---|
| One membrane system | 12 | 246 | 74.4 |
| Double membrane system | 12 | 169 | 82.4 |
| Two sets in series of two sides membranes | 12 | 35 | 96.3 |
| Do | 20 | 120 | 87.5 |
| Do | 36 | 313 | 67.4 |

Simultaneous buffering and dialysis.—In a single membrane system when the specimen of NaCl salt solution is streamed against the phosphate buffer the sodium chloride salt NaCl was dialyzed out and at the same time the phosphate buffer constituents were introduced to the specimen solution (see Table 7); thus, buffering occurred simultaneously with dialysis.

Table 7

Simultaneous dialysis and buffering. Both specimen flow and treating solution (phosphate buffer) flow were kept constant 20–25 cc./hr.

| | NaCl concentration in mM. | Phosphate concentration in mM. | pH | Efficiency of dialysis, percent | Efficiency of buffering, percent |
|---|---|---|---|---|---|
| Specimen inflow | 325 | 6 | 6.25 | | |
| Specimen outflow | 104 | 16 | 6.82 | 68 | 67 |
| Treating fluid inflow | 00 | 35.2 | 7.1 | | |
| Treating fluid outflow | 163 | 24.8 | 6.9 | | |

Concentration.—Protein concentration is possible by any of the following methods:

(a) Approaching complete removal of salts: Many proteins are not soluble in distilled water. Thus, if the specimen is streamed into dialysis sets in series, the protein is in suspension and could be spun down or centrifuged. This was tried and protein was precipitated.

(b) Isoelectric point: If the specimen is streamed against a buffer, the specimen could be buffered to the isoelectric point of the factor concerned, e.g., euglobulin or any enzyme.

(c) Dehydration or water removal.

By osmosis: The specimen is streamed against saturated solutions of hygroscopic materials of high molecular weight, such as polyvinylpyrrolidone (PVP), dextran solution or a polyvinylglycol solution such as Carbowax 400. In a single membrane system the 20 percent PVP solution was run against diluted serum. The ultra violet optical density of the diluted serum was 0.216. The specimen outlet 2, FIG. 1 was clamped and after one hour, the remaining portion of the specimen inside the instrument was taken and measured. Its ultra violet optical density was 0.685. This is about triple the protein concentration. Employing a saturated polyvinylglycol solution such as Carbowax 400, the protein in the specimen was concentrated 100 times within less than an hour.

Pressure and suction: Pressure may be applied to the flowing specimen in the set by feeding or pumping the specimen to the set at a selected rate of flow and permitting the specimen to leave the set at a lower rate of flow. The difference in the rates of flow between the inlet and the outlet of the set will place the specimen under the desired pressure. This results in the water and the filterable materials of the specimen being forced or squeezed through the membrane to the treating fluid. Alternatively, or simultaneously, the water from the specimen may be withdrawn or extracted by application of suction to the other side of the membrane or to the side paths a and c. Pressure and/or suction may be combined with osmosis by the selection of a treating fluid as indicated above.

Electrodialysis.—The electrodialysis process was performed on various salt concentrations in the specimen and with various speeds of flow. The average values of results are seen in Table 8. A decrease in specimen salt concentration or in specimen flow will lead to an increase in the efficiency of dialysis. In one stage of electrodialysis, an increase in the electric current is accompanied with increased efficiency of dialysis. The second stage is mainly used to remove the remaining traces of salt.

Table 8

The effect of specimen salt concentration and specimen flow in one stage and two stage electrodialysis. Each stage is of 30 cm. long and 2 mM. width.

| Specimen salt concentration, mM. NaCl | Specimen flow, cc./hr. | First stage electric current, milliamperes | Second stage electric current, milliamperes | Efficiency of dialysis in percent |
|---|---|---|---|---|
| 326 | 50 | 240 | | 47 |
| 326 | 50 | 300 | 240 | 100 |
| 326 | 20 | 220 | | 91 |
| 326 | 20 | 240 | | 100 |
| 326 | 20 | 220 | 40 | 100 |
| 168 | 25 | 75 | | 45 |
| 168 | 25 | 125 | | 70 |
| 168 | 25 | 250 | | 100 |
| 17 | 25 | 200 | | 100 |

In a single stage of electrodialysis the complete removal of salt is sometimes rather difficult because when a high voltage is applied, the membrane permeability is interfered with. This interference is due to the combined effect of high electric current and high voltage. In a two stage system of electrodialysis, a low voltage with high electric current is applied to the first stage to remove the majority of salt. In the second stage a high voltage with low electric current is used to remove the trace amount of remaining salt and thus, complete removal of salt is achieved without disturbing the membrane permeability. In this system a specimen of 300 millimoles of NaCl and 80 cc./hr. speed of flow was completely removed from salt.

Furthermore, in a single stage electrodialysis system employing high voltage and high current, as usually attempted, heating of the biological specimen will and does occur which results in denaturing and loss of activity of the biological factors of the specimen, i.e., proteins and enzymes. By the present two stage system, as explained above, this detrimental heating is avoided.

Additionally, experimental results have shown that my two stage electrodialysis system has resulted in a more economical operation than heretofore possible in a single stage system.

While the present invention has been explained and described with reference to specific embodiments of structure, it will be understood, nevertheless, that numerous modifications and variations are susceptible of being incorporated without departure from the essential spirit or scope thereof.

Accordingly, it is not intended for an understanding of this invention to be limited by the foregoing description nor by the illustrations in the annexed drawings, except as indicated in the hereinafter appended claims.

I claim:

1. A process for dialysis, buffering and/or concentrating fluid specimens involving:
   flowing a fluid biological specimen through a first narrow pathway on one side of permeable membrane from an input and to a output end of the first pathway; and
   simultaneously flowing an absorbing hygroscopic treating fluid for said specimen through a second narrow pathway on the other side of said membrane from an input adjacent one of the ends of said specimen passageway to an outlet adjacent the other end of the specimen passageway to effect interchange of permeable and diffusible particles through the membrane between the fluid specimen and the treating fluid, so that a desired fluid is received at the output of the first passageway having substantially no salt.

2. The process of dialysis defined in claim 1 adapted for buffering of a biological specimen wherein the treating fluid is a buffering solution to effect change in the pH of the specimen.

3. A process for concentration of a fluid specimen involving:
flowing a fluid specimen through a passageway on one side of a semi-permeable membrane from an input end to an output end of the passageway; and
simultaneously flowing a treating fluid for said specimen through a narrow passageway on the other side of said membrane from an input adjacent one of the ends of said specimen pathway to an output adjacent the other end of the specimen passageway to effect interchange of permeable and diffusible particles through the membrane between the fluid specimen and the treating fluid, said treating fluid being a hygroscopic solution of high molecular weight.

4. The process defined in claim 3 wherein the hygroscopic solution is polyvinylpyrrolidone.

5. The process defined in claim 3 wherein the hygroscopic solution is a dextran solution.

6. The process defined in claim 3 wherein the hygroscopic solution is a polyvinylglycol solution.

7. A process for dialysis of biological fluid specimens involving:
flowing of a biological fluid specimen through a first narrow passageway from an input end to an output end between two adjacently disposed and similarly formed passageways but separated therefrom by semi-permeable membranes;
simultaneously flowing treating fluids for said specimen through said adjacently disposed passageways to effect interchange of permeable and diffusible particles through said membranes along the length of said first passageway between the biological fluid specimen and said treating fluids in the adjacent passageways at least one of said fluids being of hygroscopic composition, so that a desired fluid is received at the output of said first pathway; and
controlling the rate of flow of said fluids.

8. The process defined in claim 7 wherein the flow of treating fluids is in the same direction as the flow of the fluid specimen.

9. The process defined in claim 8 wherein the flow of treating fluids is at a greater rate than the flow of the fluid specimen.

10. The process defined in claim 7 wherein the flow of treating fluid is in opposite direction or counter to the flow of the fluid specimen.

11. The process of dialysis defined in claim 7 adapted for buffering of a biological specimen wherein the treating fluids comprise a buffering solution to effect change in the pH of the specimen.

12. A process for dialysis of biological fluid specimens involving:
flowing of a biological fluid specimen through a narrow passageway from an input end to an output end between two adjacently disposed and similarly formed passageways but separated therefrom by semi-permeable membranes;
simultaneously flowing treating fluids for said specimen through said adjacently disposed passageways on the other side of said membranes to effect interchange of permeable and diffusible particles through said membranes along the length of said specimen passageway between the biological fluid specimen and said treating fluids in the adjacent passageways controlling the rate of flow of said fluids, said treating fluids comprise a hygroscopic solution of high molecular weight.

13. The process defined in claim 12 wherein the hygroscopic solution is polyvinylpyrrolidone.

14. The process defined in claim 12 wherein the hygroscopic solution is a dextran solution.

15. The process defined in claim 12 wherein the hygroscopic solution is a polyvinyl solution.

16. The process defined in claim 7 adapted for simultaneous dialysis and buffering of the biological specimen wherein the treating fluid flowing in at least one of said adjacently disposed passageways is a buffer solution.

17. A process suitable for dialysis, buffering and concentration of biological fluid specimens involving;
flowing of a biological fluid specimen through a first narrow passageway from an input end to an output end between two adjacently disposed and similarly formed passageways but separated therefrom by semi-permeable members; and
simultaneously flowing treating fluids for said specimens through said adjacently disposed passageways on the other side of said membranes to effect interchange of permeable and diffusible particles through said membranes along the length of said first passageway between the biological fluid specimen and said treating fluids in the adjacent passageways, at least one of said treating fluids flowing in either of said adjacent passageways being a buffered hygroscopic solution of high molecular weight.

18. The process of dialysis defined in claim 7 wherein different treating fluids are employed in the adjacently disposed passageways.

19. A process for dialysis of biological fluid specimens as specified in claim 7 in which concentration is effected by controlling the fluid pressure of the specimen flowing through the narrow passageway.

20. A process for electrodialysis of biological fluid speciments involving:
flowing of a biological fluid specimen through a narrow passageway between two adjacently disposed and similarly formed passageways but separated therefrom by semi-permeable membranes;
simultaneously flowing treating fluids for said specimen through said adjacently disposed passageways on the other side of said membranes to effect interchange of permeable and diffusible ions between the biological fluid specimen through said membranes to said treating fluids in the adjacent passageways, at least one of said treating fluids being hygroscopic;
inserting a plus electrode in one of said adjacent passageways and a negative electrode in the other of said adjacent passageways so that an electrical current flows from one electrode through the semi-permeable membranes and fluid specimen to the treating fluid in the other adjacently disposed passageway; and
controlling the rate of flow of each of said fluids.

21. A process of protein concentration as defined in claim 11 in which the biological fluid specimen is buffered to the isoelectric point of the protein to place the same in suspension and then removing the protein from the specimen.

22. A process of electrodialysis as specified in claim 21 wherein the adjacently disposed passageways are formed in two separate stages with separate treating fluids employed for each stage and passing different and separate electric currents through each stage.

23. A process of electrodialysis as specified in claim 22 wherein the electrical voltage applied across the second stage is greater than the voltage applied across the first stage.

24. A system of electrodialysis as specified in claim 22 wherein the electrical currents applied to the two stages are controlled to apply in the first stage a potential of up to 10 volts with a current up to 3,000 milliamperes and in the second stage a potential of from 10 to 100 volts with a current below 300 milliamperes.

References Cited

UNITED STATES PATENTS

| | | | |
|---|---|---|---|
| 1,546,908, | 9/1925 | Lapenta | 204—180 |
| 2,708,658 | 5/1955 | Rosenberg | 204—301 |
| 2,891,900 | 6/1959 | Kollsman | 204—301 |
| 3,186,917 | 6/1965 | Gerhardt et al. | 195—103.5 |
| 3,291,716 | 12/1966 | Cioffi | 204—301 |
| 3,326,790 | 6/1967 | Bergrahm | 204—180 |
| 3,346,479 | 10/1967 | Natelson | 204—180 |
| 2,694,680 | 11/1954 | Katz et al. | 204—180 |
| 2,777,811 | 1/1957 | McRae et al. | 204—151 |
| 3,330,749 | 7/1967 | Kuwata et al. | 204—180 |

FOREIGN PATENTS 764,067    12/1956    Great Britain    204—180

OTHER REFERENCES

Wilson: "Demineralization by Electrodialysis" (1960), pps. 215, 216, 292 and 293.

Ionics, Inc., "Stackpack," Bulletin L–2 (2nd ed), (1963.)

Wood: "Lab. Electrodialyzer and Desalter," Biochem. Jrnl. (1956), 62,611.

Hess et al.: "Elec. of Sheep Acth Protein Preps.," J. Amer. Chem. Soc., 73, 5918.

JOHN H. MACK, Primary Examiner

A. C. PRESCOTT, Assistant Examiner

U.S. Cl. X.R.

204—301; 210—23